(12) United States Patent
Heinloth et al.

(10) Patent No.: US 8,297,890 B2
(45) Date of Patent: Oct. 30, 2012

(54) BLADE HOLDER AND FACE MILL

(75) Inventors: Markus Heinloth, Postbauer-Heng (DE); Ralf Kloetzer, Langewiesen (DE); Helmut Klein, Abenberg (DE)

(73) Assignee: Kennametal Inc., Latrobe, PA (US)

( * ) Notice: Subject to any disclaimer, the term of this patent is extended or adjusted under 35 U.S.C. 154(b) by 467 days.

(21) Appl. No.: 12/530,215

(22) PCT Filed: Jan. 22, 2008

(86) PCT No.: PCT/DE2008/000109
§ 371 (c)(1),
(2), (4) Date: Sep. 7, 2009

(87) PCT Pub. No.: WO2008/106914
PCT Pub. Date: Sep. 12, 2008

(65) Prior Publication Data
US 2010/0104383 A1    Apr. 29, 2010

(30) Foreign Application Priority Data
Mar. 8, 2007   (DE) .................. 10 2007 011 330

(51) Int. Cl.
*B23C 5/20*    (2006.01)
*B23C 3/06*    (2006.01)

(52) U.S. Cl. .......................................... 407/40; 407/113

(58) Field of Classification Search .................. 407/11, 407/30, 113, 114, 115, 116, 100, 101, 102, 407/103
See application file for complete search history.

(56) References Cited

U.S. PATENT DOCUMENTS

| | | | | |
|---|---|---|---|---|
| 3,434,553 A * | 3/1969 | Weller | ........................ | 175/420.1 |
| 3,551,975 A * | 1/1971 | Novkov | ........................ | 407/117 |
| 3,576,060 A * | 4/1971 | Stein | ........................ | 407/117 |
| 4,252,480 A * | 2/1981 | Mizuno et al. | ........................ | 408/223 |
| 6,715,967 B2 * | 4/2004 | Wiman et al. | ........................ | 407/114 |
| 7,234,899 B2 * | 6/2007 | Fang et al. | ........................ | 407/113 |
| 2009/0097927 A1 | 4/2009 | Heinloth et al. | ........................ | 407/36 |

FOREIGN PATENT DOCUMENTS

| | | |
|---|---|---|
| DE | 4003862 | 2/1991 |
| DE | 19856931 | 6/2000 |
| DE | 102004022360 | 11/2005 |
| JP | 09207007 | 8/1997 |
| JP | 2002046002 | 2/2002 |

* cited by examiner

*Primary Examiner* — Will Fridie, Jr.
(74) *Attorney, Agent, or Firm* — Larry R. Meenan, Esq.

(57) ABSTRACT

The invention relates to a cutter support (11) for fastening to a cutter head, comprising a shaft-like pin (11) and a head, having a soldered-in cutter (12) with a minor cutting edge formed by a face (27) and a free surface (28). According to the invention the minor cutting edge has a rounded area (25), the radius of which continuously increases from a minor cutting edge end (25*a*) at least to the cutting edge center, or to the other minor cutting edge end (25*b*).

11 Claims, 5 Drawing Sheets

Figure 1:
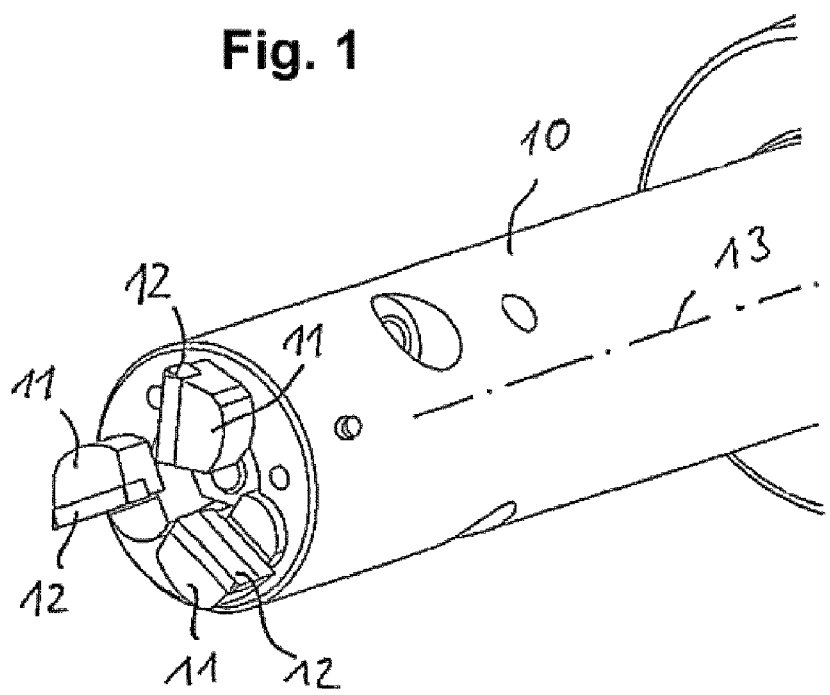

Fig. 8
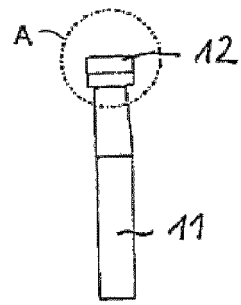
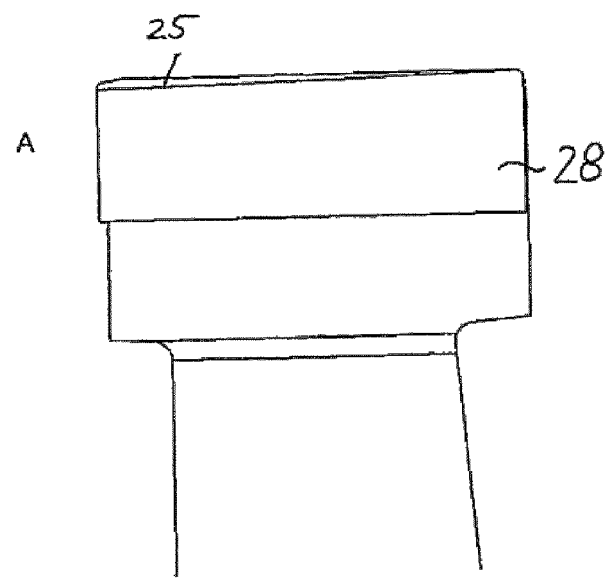
Fig. 9
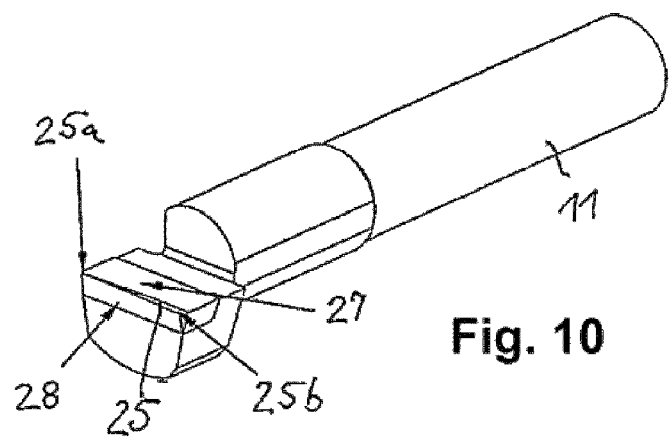
Fig. 10

BLADE HOLDER AND FACE MILL

CROSS REFERENCE TO RELATED APPLICATIONS

This application is the US national phase of PCT application PCT/DE2008/000109, filed 22 Jan. 2008, published 12 Sep. 2008 as WO2008/106914, and claiming the priority of German patent application 102007011330.9 itself filed 8 Mar. 2007, whose entire disclosures are herewith incorporated by reference.

The invention relates to a blade holder for fastening to a face mill, consisting of a shank-like pin and a head with brazed-in blade having a secondary cutting edge formed by a rake face and a flank.

The invention also relates to a face mill for orthogonal rotary milling with eccentric tool setting, in particular for the precision milling of bearings of a crankshaft or camshaft, having at least two, preferably three, eccentrically arranged blade holders of the above-described type.

A face mill of the type is known in principle from DE 40 03 862. In the face mill described there, the recesses for the blade holders extend from the one end face of its parent body parallel to its axis of rotation and at a distance from the circumference, wherein the cutting edges of the cutting tips used project only slightly beyond the end face of the parent body. Furthermore, the axes of the round wedges serving for the restraint are each disposed askew relative to the axes of the cutting tip holders carrying the cutting tips. Finally, a further round wedge having a differential screw is also provided in each case for the axial setting of each cutting tip and is arranged in a recess which extends radially inward from the circumference of the parent body. Geometrically identical round wedges are used for the axial setting and for the restraint directed radially outward. It is emphasized as an advantage of this face mill that, on account of the position of the recesses, accommodating the cutting tip holders, parallel to the rotation axis of the parent body, only radially directed centrifugal forces without axial components occur. These forces can be readily absorbed because the recesses are not located directly at the circumference of the parent body, but rather are located radially inward at a distance from the circumference. The face mill is therefore also suitable for extremely high rotary speeds and the centrifugal forces which then occur. A fine setting of the cutting elements in the axial direction without superimposition with radial components is advantageously possible.

Whereas according to the prior art crankshafts for passenger cars have been subjected to a finish machining operation by grinding or belt grinding, the grinding having been carried out using cooling lubricants for reasons related to the process, it has been possible with the development of suitable milling tools for the grinding of the crankshafts to be superseded by milling processes. On account of the design of the crankshaft, orthogonal rotary milling with eccentric tool setting and without axial feed is used. In this case, the tool performs a plunge movement, on the basis of which the bearing seats are formed exclusively by the tool secondary cutting edge. In the process, the tool must be set with respect to the workpiece in such a way as to ensure that the entire apex line of the bearing seat is covered during the engagement of the secondary cutting edge. The bearing seat diameter to be produced is generated via this apex line. For reasons related to the process, central regions of the secondary cutting edge are in engagement for a longer period than other regions. The result of this is that the cutting edge in the central region is subjected to greater wear than in the outer regions.

Further details concerning orthogonal rotary milling are described, for example, in DE 10 2004 022 360 A1. However, orthogonal rotary milling with eccentric tool setting and without axial feed has a decisive disadvantage. Due to the fact that the tool secondary cutting edge performs a plunge operation in this process, the smallest cutting edge errors or the tool wear have/has an adverse effect on the shape to be achieved and the surface quality. In particular the varying tool wear leads to premature irregularity of shape.

On account of a lack of axial feed movement, it is equally no more likely that correction of the tool wear which occurs can be effected by means of the tool feed as via changes in the path movements of the tools which are possible in other methods.

It is an object of the present invention to avoid the above-described disadvantages, in particular to find a blade design which ensures both geometrically accurate workpiece machining and as long a tool life as possible.

Furthermore, it is an object of the present invention to specify a suitable face mill for this purpose.

The first-mentioned object is achieved by a blade holder as claimed in claim 1, the secondary cutting edge of which, according to the invention, has rounding, the radius of which increases continuously from a secondary cutting edge end at least up to the cutting edge center or up to the other secondary cutting edge end. This embodiment therefore comprises both blade holders having a secondary cutting edge, the secondary cutting edge radius of which increases continuously from one end from a minimum value up to the maximum value at the other end of the secondary cutting edge, and those embodiments in which the radius increases continuously from a cutting edge corner up to the cutting edge center and then in turn decreases continuously to the end of the secondary cutting edge. In the first-mentioned case, a single wedge-shaped rounding section is obtained, and in the second case two wedges are obtained which each extend from one cutting edge end up to the cutting edge center.

In the case of straight-ground cutting edges known according to the prior art, it has been found that high initial wear, i.e. considerable flank wear, can be observed in the cutting edge center and in the region lying around the center on both sides. For reasons related to the process, this wear forms at the point of the blade which is in contact with the workpiece for the longest time. In adjacent regions which are in contact with the workpiece for shorter times, in particular with a crankshaft, the wear at the flank is lower. Further investigations have shown that, in the case of straight cutting edges, first of all continuously increasing flank wear occurs over a relatively long period. After this degressive wear process has expired, the flank wear remains constant in a "linear wear region" over a relatively longer period, before a marked increase in wear which makes the tool useless occurs in a progressive wear region.

Cutting edge rounding of the type according to the invention allows the cutting edge to be rounded with a small radius in the region of greatest wear and to be rounded with a large radius in the region of lower wear. The blade offset which occurs as a result of the blade wear is effectively countered by this geometrical configuration.

In practice, cutting edge rounding can be produced by brushing, wherein regions in which cutting edge rounding having a larger rounding radius is to be created are brushed for a longer period and with higher pressure than those regions in which the rounding radius is to be small.

Preferred embodiments of the blade holder are described in dependent claims 2 to 10.

The minimum radius at a cutting edge is to differ from the maximum rounding radius by at most 6 mm, preferably by at most 5 mm.

Rounding widths, i.e. widths of the rounded edge, as viewed perpendicularly to the cutting edge profile, which recede to 0 mm at one end of the cutting edge are optimal.

According to a further configuration of the invention, a bevel which has the rounding is arranged on the flank, i.e. the bevel has a smaller bevel rounding radius at the outer secondary cutting edge ends than in the center of the secondary cutting edge or than at the other end, depending on whether a simple wedge-shaped conical bevel design or a double conical bevel is to be produced. The width of the bevel at one secondary cutting edge end preferably runs out to 0 mm, and also preferably continuously. The maximum bevel width is 10 mm, preferably at most 4 mm. The bevel width is in particular to decrease continuously to 0 mm in particular on both sides as seen from the secondary cutting edge center. The cutting edge or the bevel is preferably rounded by means of a brush polishing machine, and in particular is convexly ground with a camber angle of 89.5° to 90° relative to the rotation axis of the tool holder.

According to a further configuration of the invention, the smallest radius of the convexly ground flank or cutting edge region is 800 mm. Clearance angles are preferably around 10°±2°.

Furthermore, to solve the object, a face mill as claimed in claim 11 or 12 is proposed. According to the invention, in the face mill having a plurality of blade holders of the above-described type, the radius of the cutting edge rounding at the cutting edge end which describes a smaller pitch circle when the face mill is rotating is smaller than the radius of the cutting edge rounding which describes a large pitch circle. Alternatively, a respective blade holder is used which has a rounded-off bevel having a bevel width decreasing outward to 0 mm, wherein the bevel width in each case increases up to a maximum value from the end of the secondary cutting edge toward the cutting edge center. The radius of the bevel rounding is at a minimum at the outer secondary cutting edge corners and increases toward the cutting edge center to a larger conical bevel radius. A blade with edges prepared in such a way has edge stabilization in the region of maximum wear, and this edge stabilization effectively counters the otherwise normal cutting edge offset as a result of wear.

Figure 2:
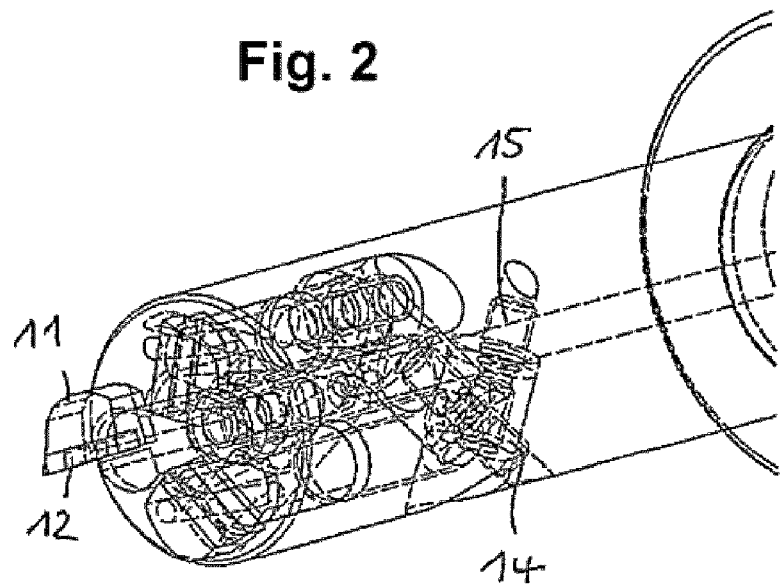
Figure 3:
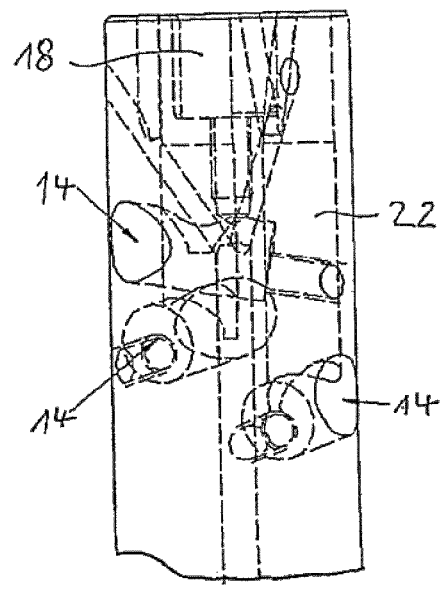
Figure 4:
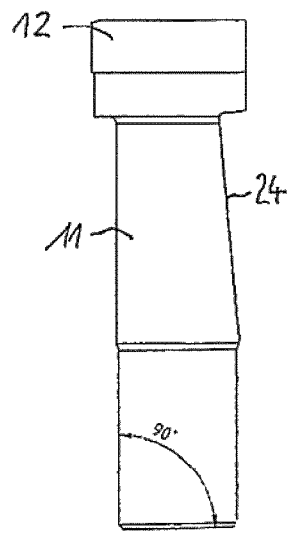
Figure 5:
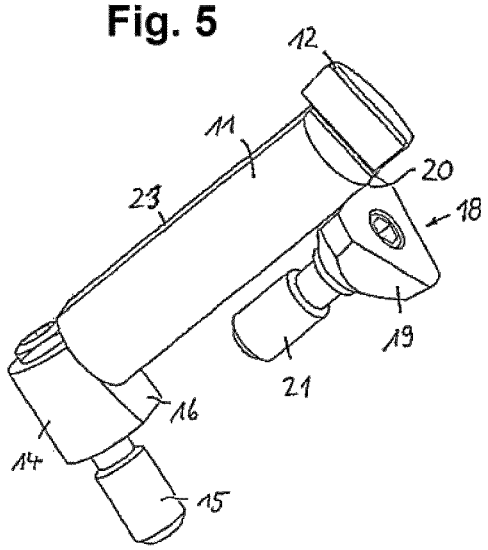
Figure 6:
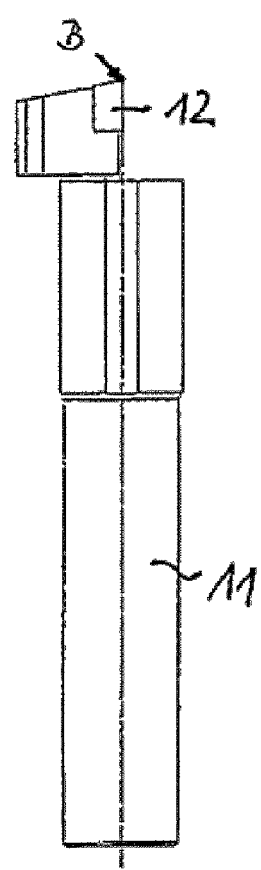
Figure 7:
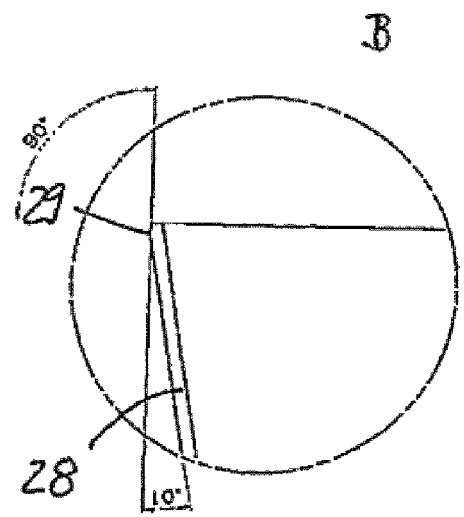
Figure 11:
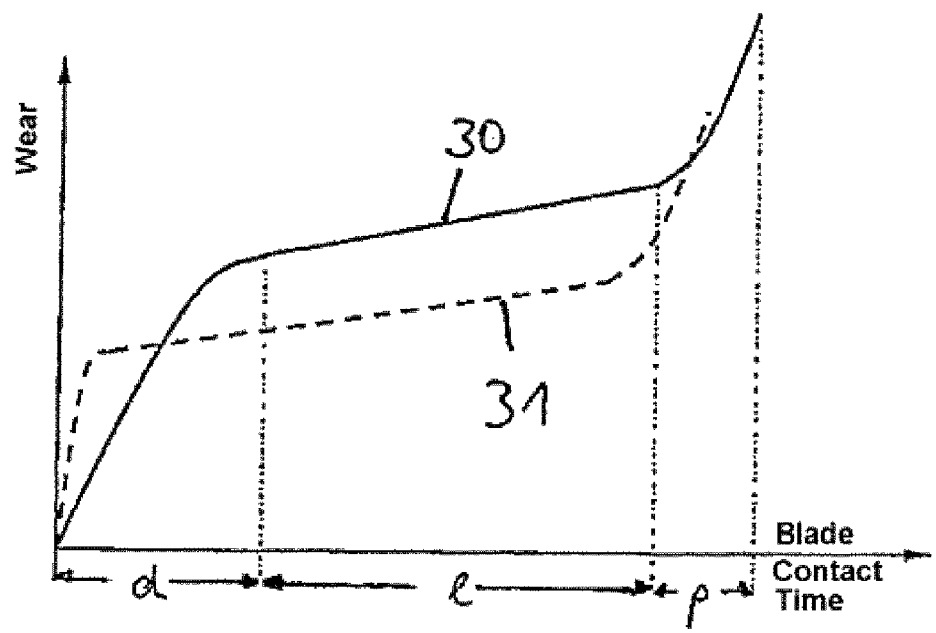
Figure 12:
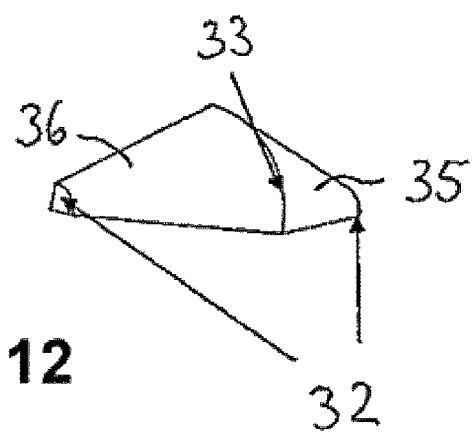

Further illustrated embodiments and advantages are discussed below with reference to the drawings, in which:

FIG. 1 shows a perspective view of a face mill having three blade holders,

FIG. 2 shows an illustration of the face mill according to FIG. 1 like a wire-frame model, FIG. 3 shows a longitudinal cross section through a face mill without blade holders, FIG. 4 shows a side view of a blade holder, FIG. 5 shows a diagrammatic sketch of the position of a blade holder relative to a clamping piece and a wedge body for the axial setting, FIG. 6 shows a further side view of the blade holder, FIG. 7 shows an enlarged detail of the region "B", FIG. 8 shows a further side view of the blade holder, FIG. 9 shows an enlarged detail of the region "A", FIG. 10 shows a plan view of the blade head according to FIG. 9, FIG. 11 shows a schematic wear curve, and FIG. 12 shows a schematic illustration of a further embodiment of bevel or cutting edge rounding.

The face mill shown in FIGS. 1 to 3 essentially comprises a parent body 10 in which three blade holders 11 having respectively brazed-on blades 12 are brazed in place. The blade holders 11 are inserted into respective bores 22 (see FIG. 3) arranged parallel to the longitudinal axis 13. Further bores are provided in the parent body 10 substantially in the radial direction or at a slight angle thereto, and arranged in the bores are wedge bodies 14 which are displaceable in the radial direction via an adjusting screw 15, preferably a twin-thread screw.

As can be seen from FIG. 5, the wedge bodies 14 have wedge surfaces 16 which run obliquely relative to the radial plane of the parent body, such that, during a radial movement of the wedge body 14, the blade holder 11 can be displaced along its longitudinal axis, i.e. in the axial direction. Serving to clamp the blade holders is the clamping piece 18, which is arranged centrally and has three clamping surfaces 19 which bear against corresponding clamping surfaces of the blade holders 11. The clamping piece 18 can be fixed by means of a screw 21, which is preferably designed as a twin-thread screw. In the case shown, the clamping piece 18 serves to fix three blade holders 11, which each have a planar surface 20. Exact orientation of the blades 12 and of the blade holders 11 at an angle of 120° to one another (see FIG. 1) is achieved by the design of the clamping piece 18 and by the arrangement of the clamping surfaces 19 in a triangular shape. Each blade holder 11 can be axially adjusted via a round wedge and the associated screw 15. The bores 22 serve for the axially parallel orientation of the blade holders and thus of the blades. The surface 23 serves to ensure that no linear contact occurs between blade holder 11 and bore 22. As shown in FIG. 4, the blade holder 11 also has an inclined surface 24, the inclination of which corresponds to the inclination of a surface 19 of the clamping piece.

Alternatively, it is possible to use, instead of true-to-size bores, an external tightening ring in combination with an axially centrally arranged clamping piece, between which the blade holders 11 can be fixed. The tightening ring is then screwed or shrunk onto the parent body 10.

It can be seen from FIG. 7, which shows an enlarged detail of the region B of the brazed-on blade 12, that the flank 28 is arranged at a clearance angle of 10°. The pre-wear bevel designated by 29 is a rounded-off bevel which has the task of simulating the wear pattern which is characteristic of the method, while taking into account the requisite blade camber. By means of this measure, the degressive wear characteristic d, which results in cutting inserts known according to the prior art and is shown with the aid of the curve 30 in FIG. 11, is markedly reduced to a considerable extent in favor of the linear region 1 in accordance with the dashed-line illustration. The region of the progressive wear is designated by p.

As can be seen in detail from FIGS. 8 and 10, a conically shaped rounded-off bevel 25 which has been produced by rounding by brush is provided in the top region of the flank. The rake face 27 (see FIG. 10) is arranged at a rake angle of 0°. The conical, rounded-off bevel 25 has a small radius at the first cutting edge end 25a and a large radius at the opposite end 25b. The blade holder according to FIGS. 6 to 10 is inserted into the face mill in such a way that the end 25a having a small radius is directed toward the tool axis, whereas the opposite end 25b having a large radius is arranged on the side toward the tool outside diameter.

In contrast, FIG. 12 shows an embodiment variant having a double conical bevel in which respectively outer smaller radii 32 have been selected for the bevel rounding opposite an inner large radius 33 of the bevel rounding. Two ¼ conical frustums which are superimposed with their base areas are thereby obtained.

With the measure according to the invention, it has been possible to markedly reduce the chipping of the cutting edges.

The invention claimed is:

1. A blade holder for fastening to a face mill, comprising a shank-like pin and a head with a blade having a secondary cutting edge formed by an intersection between a rake face and a flank, wherein the secondary cutting edge includes a rounded bevel having a first radius at a first end of the secondary cutting edge and a second, different radius at a second, opposite end of the secondary cutting edge, the first radius being smaller than the second radius.

2. The blade holder as claimed in claim 1, wherein a difference between the first radius and the second radius is less than or equal to 6 mm.

3. The blade holder as claimed in claim 1 wherein the width of the bevel, as viewed perpendicularly to a cutting edge profile, is reduced to a minimum of 0 mm at the first end of the secondary cutting edge.

4. The blade holder as claimed in claim 1 wherein the radius of the bevel is a maximum at a center of the secondary cutting edge.

5. The blade holder as claimed in claim 4 wherein the radius of the bevel is 0 mm at both the first end and the second, opposite end of the secondary cutting edge.

6. The blade holder as claimed in claim 1 wherein a maximum radius of the bevel is <6 mm.

7. The blade holder as claimed in claim 1 wherein the bevel is formed by means of a brush polishing machine, and is convexly ground with a camber angle of 89.5° to 0° relative to a rotation axis of the tool holder.

8. The blade holder as claimed in claim 7 wherein the bevel has a minimum radius of at least 800 mm.

9. The blade holder as claimed in claim 1 wherein the blade is mounted to the blade holder such that the flank has a clearance angle of 10°±2°.

10. A blade for a face mill comprising a secondary cutting edge formed by an intersection between a rake face and a flank, wherein the secondary cutting edge includes a rounded bevel having a continuously varying radius from a first end of the secondary cutting edge to a second, opposite end of the secondary cutting edge, the radius at the first end being smaller or equal to the radius at the second end.

11. A face mill for orthogonal rotary milling with eccentric tool orientation for the precision milling of bearings of a crankshaft or camshaft, the face mill having at least two eccentric blade holders each comprising a shank-like pin and a head provided with brazed-in blades, each blade having a rake face, a flank and a secondary cutting edge formed at an intersection between the rake face and the flank, the secondary cutting edge having a rounded bevel, wherein the bevel extends along the secondary cutting edge and has a width that decreases to 0 mm at a first end of the secondary cutting edge, and reaches a maximum at an opposite, second end of the secondary cutting edge when viewed perpendicularly to a rotation axis of the face mill.

\* \* \* \* \*